Figure 8:
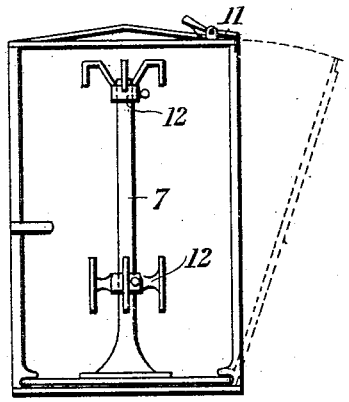

No. 713,621. Patented Nov. 18, 1902.
S. H. ELLIS & T. HOLT.
DIPPING CERAMIC GLASS, &c.
(Application filed Oct. 22, 1900.)
(No Model.) 3 Sheets—Sheet 1.
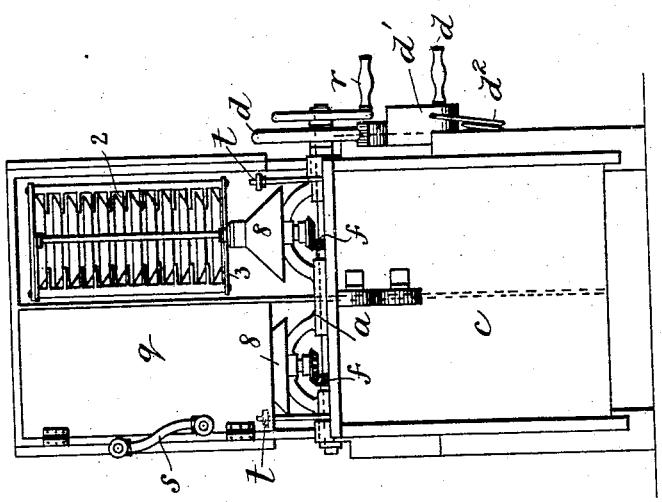

No. 713,621. Patented Nov. 18, 1902.
S. H. ELLIS & T. HOLT.
DIPPING CERAMIC GLASS, &c.
(Application filed Oct. 22, 1900.)
(No Model.) 3 Sheets—Sheet 2.
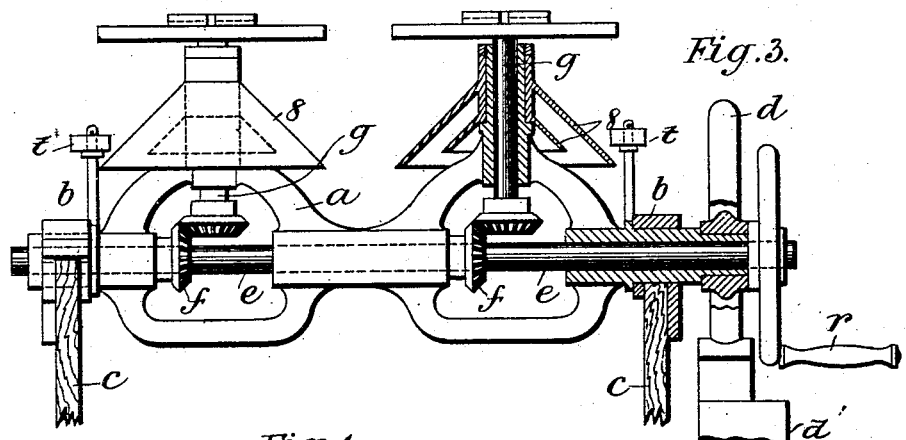
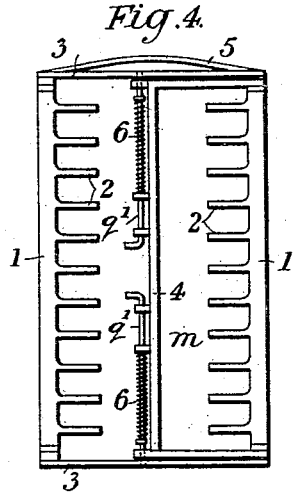
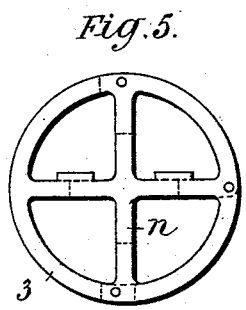
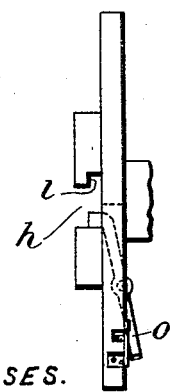
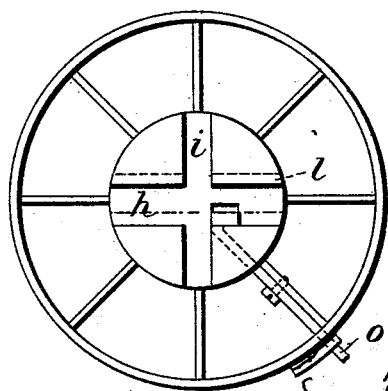
WITNESSES.
Albert Jones.
Samuel Percival.
INVENTORS.
Samuel Henry Ellis
Thomas Holt
By their Attorneys
Wheatley & Mackenzie No. 713,621. Patented Nov. 18, 1902.
S. H. ELLIS & T. HOLT.
DIPPING CERAMIC GLASS, &c.
(Application filed Oct. 22, 1900.)

(No Model.) 3 Sheets—Sheet 3.

WITNESSES.
Albert Jones.
Samuel Percival.

INVENTORS.
Samuel Henry Ellis
Thomas Holt
By their Attorneys
Wheatley & MacKenzie.

UNITED STATES PATENT OFFICE.

SAMUEL HENRY ELLIS, OF HANLEY, AND THOMAS HOLT, OF STOKE-UPON-TRENT, ENGLAND.

DIPPING CERAMIC GLASS, &c.

SPECIFICATION forming part of Letters Patent No. 713,621, dated November 18, 1902.

Application filed October 22, 1900. Serial No. 33,903. (No model.)

*To all whom it may concern:*

Be it known that we, SAMUEL HENRY ELLIS, residing at 13 Lichfield street, Hanley, and THOMAS HOLT, residing at Ebenezer House, Quarry avenue, Stoke-upon-Trent, in the county of Stafford, England, subjects of the Queen of Great Britain and Ireland, have invented certain new and useful Improvements in or Connected with Dipping Ceramic Glass and Like Ware, (for which they have made application for patent in Great Britain, No. 5,673, dated March 27, 1900;) and we do hereby declare the following to be a full, clear, and exact description of the invention, such as will enable others skilled in the art to which it appertains to make and use the same.

This invention for improvements in or connected with dipping ceramic glass and like ware has for its object to obviate the hand operations in dipping ceramic glass and like ware in glaze and consequent risk of lead-poisoning, while the output of dipped ware is considerably increased; and it consists in a machine for dipping ware.

A machine constructed according to this invention consists of a tub with hood and doors, a horizontal hollow bracket mounted on the top of the tub, so that it can be rotated through half a rotation, more or less, forward and backward, shafts at right angles to the bracket and with heads or couplings mounted in the bracket, a horizontal shaft within the bracket geared to the headed shafts and provided outside with an operating-handle, and a cage adapted to hold the article or articles to be dipped and to couple onto the head of a headed shaft.

Assuming the bracket to be in its normal position with the headed shafts vertical and the head uppermost, the articles to be dipped are placed in the cage, the cage is placed and fixed on the head and the bracket rotated half a rotation, so that the cage is dipped into glaze contained in the tub, the horizontal shaft is rotated, rotating the articles in the glaze, and the bracket is turned back to its normal position while still rotating the horizontal shaft to spread the glaze evenly and throw off superfluous glaze. Suitable stops limit the motion of the bracket and the doors are self-closing, being automatically opened by the bracket as it returns to its normal position.

Figure 9:
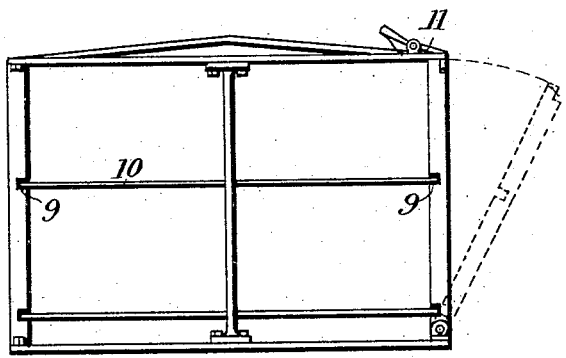
Figure 10:
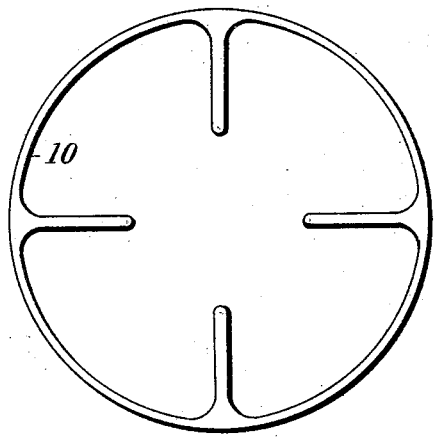

In the accompanying sheet of illustrative drawings, Figures 1 and 2 are respectively side and front elevations of a dipping-machine constructed according to this invention. Fig. 3 is a detail view of the operating machinery. Figs. 4 and 5 are detail views of a cage for holding plates or the like, and Figs. 6 and 7 are detail views of the head on which the cage is secured. Fig. 8 is a detail view of a cage for holding ewers, and Figs. 9 and 10 are detail views of a cage for holding wash hand-basins or the like.

The hollow bracket $a$ is mounted in bearings $b$ on the top of a tub $c$ and is provided outside the tub with the handle $d$ and with a counterweight $d'$. The horizontal shaft $e$, having the operating-handle $r$, is mounted in the bracket $a$ and has rigidly fixed on it bevel-wheels $f$, gearing into similar wheels on the ends of headed shafts $g$, mounted in the bracket $a$ at right angles to the shaft $e$. In the position shown, the normal position, the shafts $g$ are vertical, with their heads uppermost. The spring $d^2$, in conjunction with the stop $w$, serves to retain the bracket $a$ in its normal position. The bearings are protected from the glaze by the hoods 8. The heads correspond in shape to the bottom of cage and are provided with two grooves $h\ i$ at right angles to one another, one groove, $h$, having a projecting lip $l$. The bottom of the cage $m$ is provided with radial bars $n$, that drop into the grooves $h\ i$, and the cage is then pushed backward to force one cross-bar under the lip $l$ and is retained in this position by the spring lever or catch $o$. The tub is provided with a hood $p$ and with doors $q$, closed by the springs $s$. Projections $t$ on the bracket as the bracket $a$ comes back to its normal position press against the inside faces of the double doors and open the doors. At the front of the tub is the table $v$, on which is fixed an arm $y$, that comes against one of the bearings of the headed shafts and prevents the bracket being turned beyond its normal position. A projection $w$ on the outside of the tub prevents the handle $d$ being turned too far in that direction.

The cage consists of the vertical bars 1 4, provided with projections 2 to receive, hold, and separate the plates, and of the end rings 3, in which the bars 1 are fixed. The bar 4 is fixed to the curved pieces 5, that pivot on the adjacent bar 1, so that the bar 4 can be moved out of the way to insert or remove plates. On the bar 4 the double bolt $q'$ slides vertically in bearings on the bar and is forced outward by the helical springs 6. The ends of the bolts take into recesses in the rings 3. The curved arms are bifurcated at their ends to clasp the rings and retain themselves in position vertically.

In the cage shown in Fig. 8 the cage is provided also with a support 7, having adjustable heads 12 sliding thereon to hold the ewers, the heads projecting outward from the support 7.

In the cage shown in Fig. 9 notches 9 are provided in the upright bars to receive rings 10, on which the basins are placed.

In both Figs. 8 and 9 one vertical bar is hinged and held in position by a spring-catch 11 to enable the articles to be placed in or withdrawn from the cage.

What we claim, and desire to secure by Letters Patent, is—

1. A machine for dipping ware, consisting of a tub, a horizontal bracket mounted on the tub and adapted to be rotated half a revolution more or less, headed shafts mounted in the bracket at right angles to and geared to the horizontal shaft and cages adapted to fit and be retained on the heads.

2. A machine for dipping ware consisting of a tub, a horizontal bracket mounted on the tub and adapted to be rotated half a revolution more or less, a headed shaft mounted in the bracket at right angles to and geared to the horizontal shaft, and vertical bars with projections, end rings in which the bars are secured the lower one of which is adapted to fit and be retained on the head of the vertical shaft, and a vertical bar hinged to one ring and adapted to be detachably secured to the other end ring.

In testimony whereof we have affixed our signatures in presence of two witnesses.

SAMUEL HENRY ELLIS.
THOMAS HOLT.

Witnesses:
GEORGE F. ADCOCK,
J. H. COPESTAKE.